United States Patent
Tennis

[15] 3,677,281
[45] July 18, 1972

[54] CONTROL VALVE AND ACTUATING LEVER ASSEMBLY THEREFOR

[72] Inventor: Francis H. Tennis, Oconomowoc, Wis.
[73] Assignee: Hydraulic Industries, Inc., Hartland, Wis.
[22] Filed: Aug. 28, 1970
[21] Appl. No.: 67,710

[52] U.S. Cl. ........................................137/270, 251/280
[51] Int. Cl. ................................F16k 31/28, F16k 31/46
[58] Field of Search ..................137/270, 271, 269; 251/280

[56] References Cited

UNITED STATES PATENTS

| | | | |
|---|---|---|---|
| 2,535,590 | 12/1950 | Monsarrat | 251/280 X |
| 3,076,476 | 2/1963 | Campbell | 137/625.68 |
| 3,387,628 | 6/1968 | Flint et al. | 137/271 X |
| 3,473,566 | 10/1969 | Peppel | 137/625.69 X |
| 3,529,702 | 9/1970 | Eckstein, Jr. | 137/625.69 X |
| 650,777 | 5/1900 | Bromley | 137/625.68 |
| 2,320,905 | 6/1943 | Bateholts | 137/625.68 |

Primary Examiner—M. Cary Nelson
Assistant Examiner—Robert J. Miller
Attorney—Ira Milton Jones

[57] ABSTRACT

A control valve with an actuating lever which is selectively connectible in any of a number of different attitudes with a supporting link and with the valve member to be actuated. Lever produced movement of the valve member to one of its operating positions effects cocking of a toggle joint defined by the link and part of the lever connected thereto. The return spring acting upon the valve member yieldingly holds the toggle joint in cocked condition.

6 Claims, 7 Drawing Figures

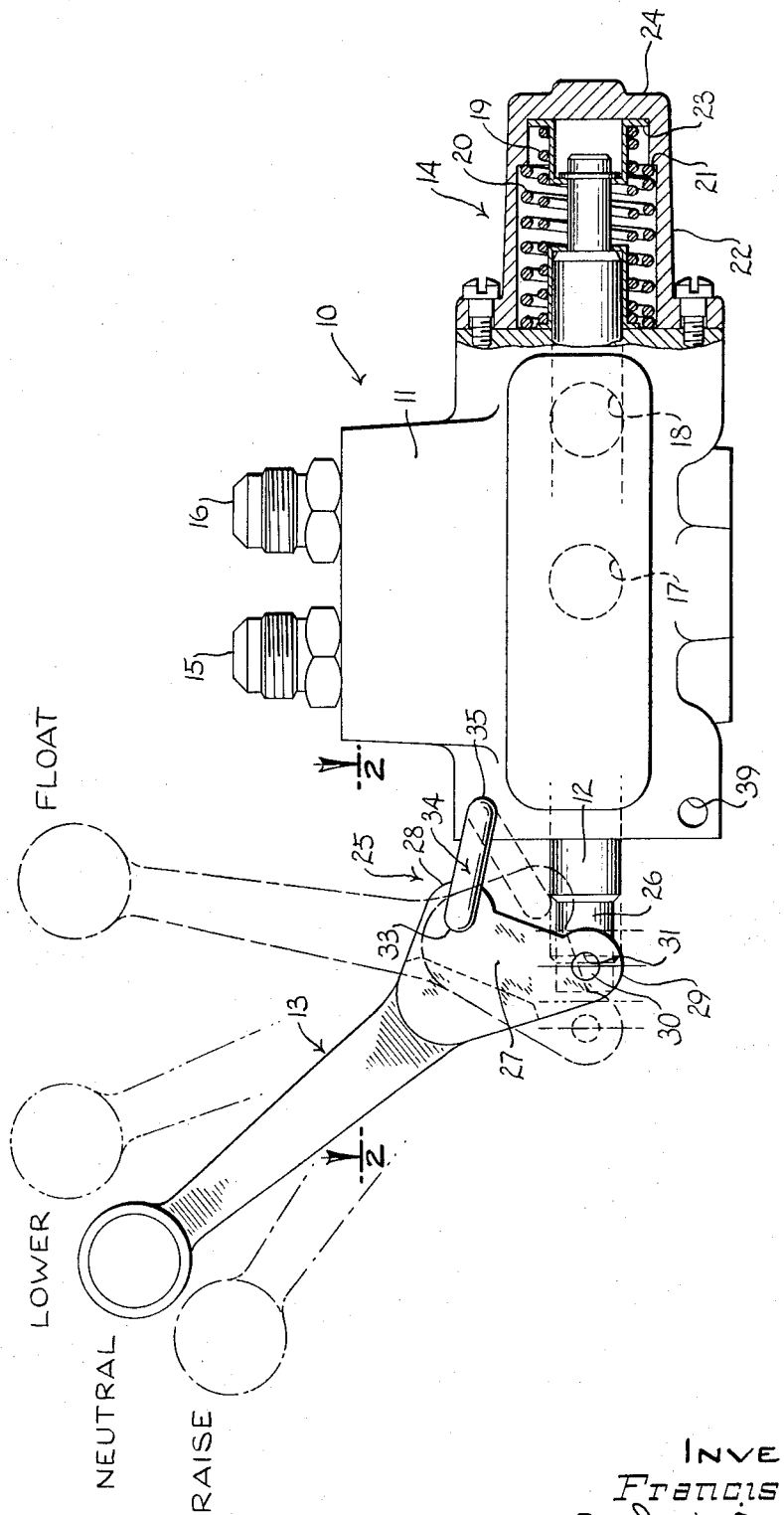

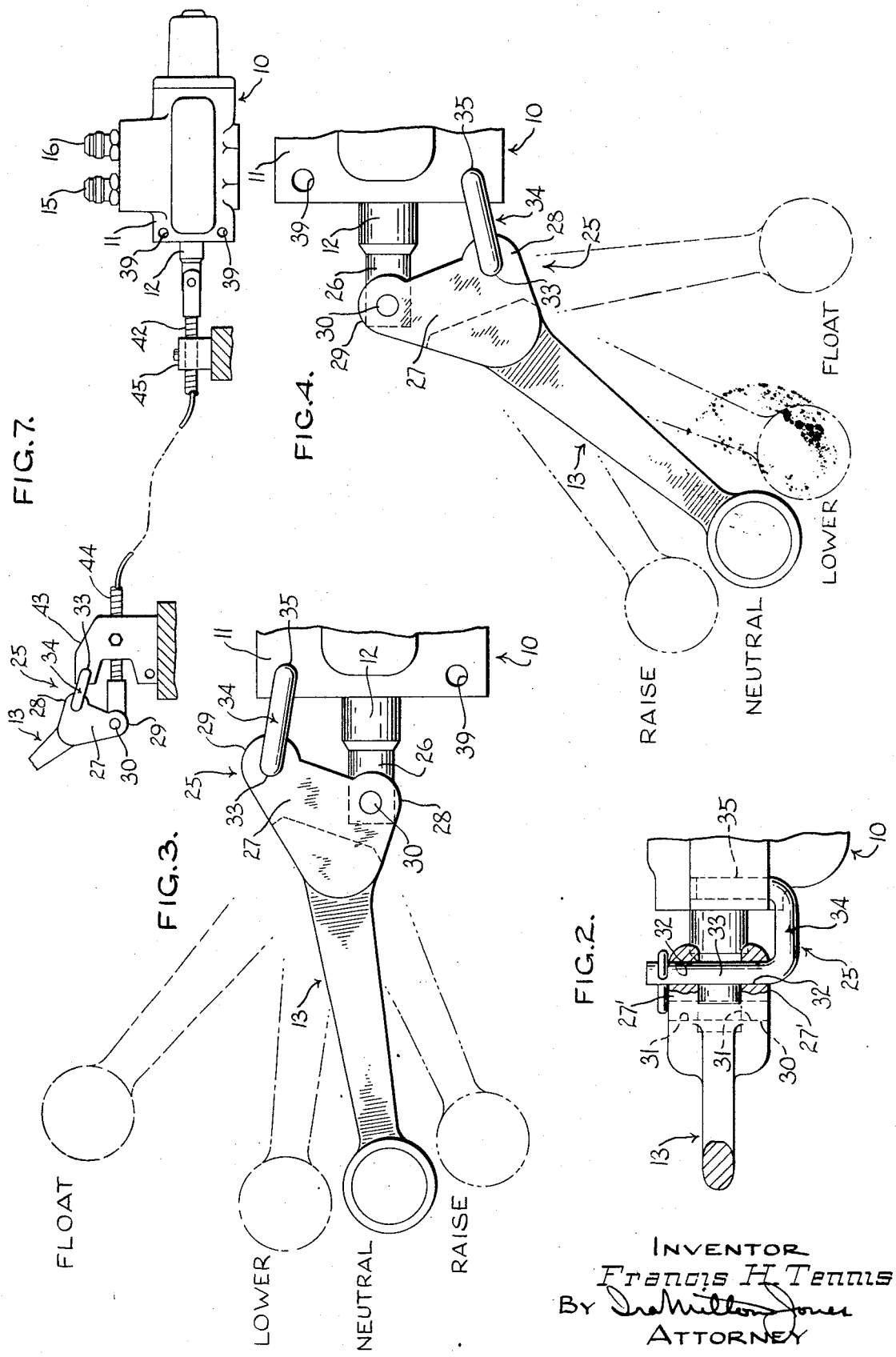

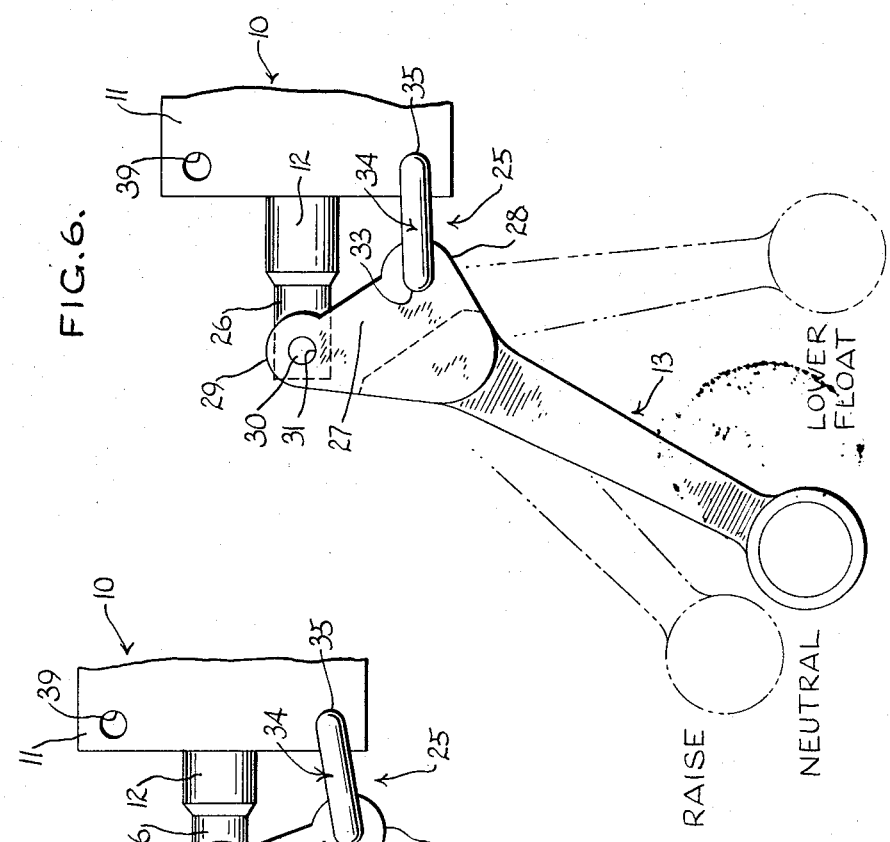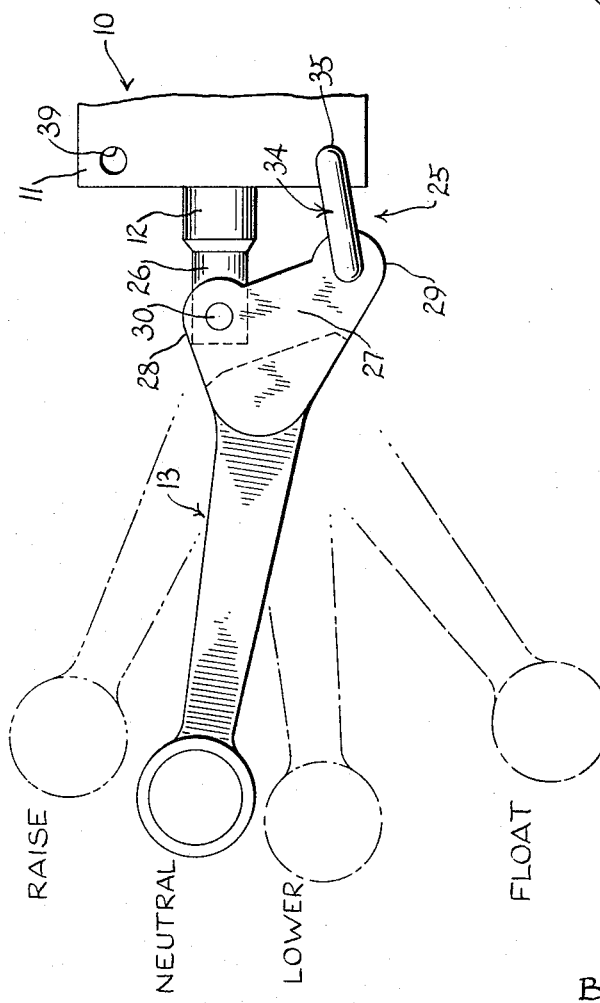

CONTROL VALVE AND ACTUATING LEVER ASSEMBLY THEREFOR

BACKGROUND OF THE INVENTION

This invention relates to hydraulic control valves of the type having a valve member which is movable from a neutral position to a working position against the force of a return spring acting upon the valve member. More particularly, this invention concerns improvements in the actuating lever assemblies by which such movement is imparted to the valve members of control valves.

Most control valves of the type herein concerned are provide with a valve actuating lever which is constrained to swing limited distances in opposite directions from a neutral position which always bears the same predetermined positional relationship to the body of the valve. This can often result in considerable annoyance to the operator of the valve, especially if valve mounting requirements are such as ti impair the accessibility of its actuating lever or to otherwise make it awkward to reach and operate.

Hydraulic control valves such as herein concerned also have been provided with various mechanisms to define certain operating positions of a valve member thereof, and/or to releasably hold the valve member in one or more of those positions until the operator of the valve manually actuates it to another position, such as to neutral. Detent mechanisms are among the more common of such expedients for defining and/or for releasably holding the valve member against biased return to its neutral position.

Despite the fact that detent mechanisms have achieved a notable state of simplicity, they nevertheless require a number of machining operations and extra parts such as balls and springs to act on the balls, all of which adds to the cost of manufacture and complicates valve assembly procedures.

SUMMARY OF THE INVENTION

This invention has as one of its objectives, the provision of an actuating lever assembly for hydraulic control valves, wherein the lever can be supported in any of a variety of different positions corresponding to the neutral position of the valve member connected thereto, so as to thereby enable the lever to occupy the most convenient position of accessibility regardless of the orientation of the valve body.

Another purpose of the invention is to provide simplified means for determining one or more of the operating positions of the valve member of a control valve.

In a more specific sense, it is an object of this invention to provide a toggle joint so associated with the valve element of a control valve that the knee of the toggle joint is carried a slight distance past dead center to a defined toggle cocked position in consequence of actuation of the valve member to one of its operating positions, and which toggle joint is releasably maintained in cocked condition under the force of the return spring acting on the valve member.

Still another purpose of the invention is to provide an operating lever assembly such as described in the preceding objects, wherein the lever can be mounted remotely from the valve activated thereby, and the toggle joint connection with the lever comprises portions of the operating lever itself and of a link by which the lever is pivotally supported for valve actuating motion, whereby said toggle joint will be effective whatever the selected orientation of the lever, or of its mounting relative to the control valve.

With these observations and objectives in mind, the manner in which the invention ahcieves its purpose will be appreciated from the following description and the accompanying drawings, which exemplify the invention, it being understood that such changes in the specific apparatus disclosed herein may be made as come within the scope of the appended claims.

The accompanying drawings illustrate one complete example of the embodiment of the invention constructed according to the best modes so far devised for the practical application of the principles thereof, and in which:

FIG. 1 is a view partly in elevation and partly in section, of a control valve embodying this invention;

FIG. 2 is a fragmentary view partly in section, taken on the line 2—2 in FIG. 1;

FIGS. 3, 4, 5 and 6 are fragmentary elevational views similar to FIG. 1, but showing optional ways of mounting the actuating lever on the valve; and FIG. 7 is a diagrammatic view illustrating how the objectives of this invention can be achieved when the actuating lever and the valve governed thereby are located remote from one another.

DESCRIPTION OF THE PREFERRED EMBODIMENTS

Referring now particularly to the accompanying drawings, the numeral 10 generally designates a control valve having a body 11, an elongated valve member 12 slidable axially in a bore (now shown) in the body, and an operating lever 13, connected with the valve member, by which it can be manually shifted from one position to another. The valve member 12 can comprise an axially slidable spool.

A centering spring mechanism 14 acts upon the spool at one end thereof to normally hold the valve member in neutral, with the lever 13 connected thereto in the solid line position seen in the drawings and bearing the legend "NEUTRAL." In most instances, when the valve spool is in neutral, it closes off each of a pair of service ports 15 ans 16 from inlet as well as outlet ports 17 and 18, respectively, in the valve body.

The centering spring mechanism comprises a pair of concentric inner and outer springs 19 and 20, respectively, the former being the main spring and being longer than the outer spring 20. The spring 19 is arranged to at all times act upon the valve spool in a conventional way. The shorter spring 20 is the stronger, and it is normally confined between the adjacent end of the valve body and an opposing shoulder 21 on the cover 22 enclosing the springs. It does not act upon the valve spool until after it has been moved a predetermined distance to the left, against the force of spring 19, to the "LOWER" position indicated in FIG. 1. At that time, a flange on the outer spring seat member 23 collides with the outer end of the spring 20 to warn the operator, by feel, that he has reached the "LOWER" position of the valve spool.

In its "LOWER" position, the valve spool directs supply fluid under pressure from the inlet 17 to one of the service ports, for example port 16, and communicates the other service port 15 with the outlet port 18 in a more or less conventional way.

The valve spool 12 can be shifted farther to the left by its actuating lever 13, against the combined forces of springs 19 and 20, to a "FLOAT" position at which the service ports 15, 16 are in effect communicated with one another.

From the description thus far, it will be seen that the centering spring 19 defines one position of the valve spool, namely "NEUTRAL;" and that the outer end of the stronger spring 20 is engageable by the flange on the spring seat member 23 to define the "LOWER" position of the valve spool.

The right hand extremity of the valve spool can engage the end wall 24 of the spring cover 22 to define its "RAISE" position, at which the valve spool is displaced to the right of its "NEUTRAL" position and then serves to communicate the service port 15 with the inlet 17 and to communicate the other service port 16 with the outlet 18.

Hence, with the construction described, three of the four positions of the valve spool 12 are defined without the use of detent mechanisms such as were heretofore used for that purpose. According to this invention, the fourth position of the valve spool, namely its "FLOAT" position, is also defined without reliance upon detent mechanisms such as were conventional heretofore.

In its "FLOAT" position, the valve spool is at its left hand limit of motion, namely a distance to the left of its "LOWER" position. It is shifted to the "FLOAT" position when the operator swings the actuating lever 13 to its clockwise limit of motion illustrated by broken lines and marked "FLOAT" in FIG. 1. As will now be described, such shifting of the valve spool to its "FLOAT" position effects cocking of a toggle joint 25 which is connected with the spool at that end 26 thereof which projects from the left hand end of the valve body; the toggle joint being effective, when cocked, to releasably hold the valve spool against return motion toward its "NEUTRAL" position.

The toggle joint 25 can be connected with the spool 12 in any of a number of ways for the above stated purpose. It is a feature of this invention, however, that the toggle joint acts upon the spool through a portion of the actuating lever 13, specifically a foot 27 on the terminal end of the lever, which foot projects to one side of the lever. The foot can be bifurcated, as shown best in FIG. 2 to provide opposite bifurcations 27' which straddle the projecting end portion 26 of the valve spool to facilitate connection of the foot thereto. It is formed with a heel portion 28 and a toe portion 29, and as seen in FIG. 1, the bifurcated toe portion 29 embraces the projecting end 26 of the spool and is connected thereto by a pivot pin 30. The pin 30, of course, passes through aligned holes 31 in the bifurcated tow portions, which holes thus can be said to constitute pivot defining means on the foot of the lever at its toe.

The bifurcated heel portions are also provided with aligned holes 32 equal in diameter to the holes 31, to receive a pivot pin 33. The holes 32 thus can be said to constitute other pivot defining means on the foot of the lever, at its heel. The heel portion of the foot is pivotally connected to one end of a lever supporting link 34 by the pivot pin 33. The other end of the link 34 is connected by a pivot pin 35 to stationary supporting means, which can be a portion of the valve body itself having one or more pin receiving holes 39 therein.

In the present case, the link 34 is shown as a substantially U-shaped bail made from round cross section stock. Its opposite arms are parallel and provide the pivot pins 33 and 35. The axes of the pins 30, 33 and 35 are all parallel and spaced apart from one another, and the pivot pin 33 defines the knee of the toggle joint connection between the lever and the valve spool. The foot 27 on the extremity of the lever, of course, provides the other link of the toggle joint.

In the "NEUTRAL" position of the actuating lever and spool seen in FIG. 1, the foot 27 on the lever extends downwardly and slightly outwardly from the knee 33 of the toggle joint to the pivot 30 connecting its toe with the valve spool; and the link 34 extends outwardly and slightly upwardly from the pivot pin 35 to the knee of the toggle joint.

As the lever 13 is turned in the clockwise direction the extent necessary to shift the valve spool 12 to its "FLOAT" position, it imparts counterclockwise swinging motion to the link 34 about its pivot 35, to thereby effect downward movement of the knee 33 of the toggle joint toward and slightly beyond a dead center position to a toggle cocked position at which the knee lies below a dead center plane containing the axes of the pins 30 and 35. The cocked position of the toggle joint in this case is defined by the engagement of the knee 33 of the toggle with the projecting end portion 12 of the valve spool.

Both springs 19 and 20 resist motion of the spool to its "FLOAT" position, with maximum resistance occuring at the dead center position of the toggle, at which the axis of its knee and the axes of the pivot pins 30 and 35 all lie in a common plane. As the knee passes over the dead center plane, the restoring force of both springs is imposed upon the toggle joint through the valve spool, thus releasably holding said joint in cocked condition, with its knee 33 engaging the projecting end portion 12 of the valve spool.

The spool will be retained in the "FLOAT" position described by said toggle joint connection until the operator of the valve exerts force on the actuating lever to swing it counterclockwise out of its "FLOAT" position. Upon such initial counterclockwise motion of the lever, the knee 33 of the toggle joint is moved back across the dead center plane, so that the springs 19 and 20 then exert force on the spool in the direction to return it toward its "NEUTRAL" position at which the toggle joint is in a collapsed condition.

With the arrangement described, the operating range of the handle provided by the actuating lever will be entirely to one side of the axis of the spool. The handle will be nearly vertical at its clockwise limit of motion, namely in "Float," position and it will be approximately midway between its "FLOAT" position and horizontal at its counterclockwise limit of motion, namely in the "RAISE" position of the handle.

FIG. 3 illustrates how the same actuating lever 13 can be reconnected and oriented such that its operating range will extend to opposite sides of the valve spool, with its "FLOAT" position spaced a slightly greater distance from the spool axis than its "RAISE" position. In fact, in its FIG. 3 orientation, the lever handle extends substantially lengthwise along the spool axis when it its "NEUTRAL" position.

This reorientation of the lever is made possible by connecting its toe portion 29 with the knee 33 of the toggle, and then connecting its heel portion 28 with the pivot pin 30 on the projecting end portion 26 of the spool. Again in this case, the foot 27 on the lever provides one of the two articulated links of the toggle joint 25, and the latter serves the same purpose of defining the "FLOAT" position of the mechanism and of releasably maintaining the valve member in said position under the force of the centering spring mechanism acting on the valve spool.

FIGS. 4 and 5 illustrate toe and heel connections, respectively, between the actuating lever and the valve spool, when the supporting link 34 of the toggle joint 25 is mounted on the valve body for swinging motion about an axis at the side of the spool opposite that seen in FIG. 1. Two holes 39 are provided in the valve body for that purpose. It is to be understood, of course, that the toggle joint 25 functions in the same manner as described previously.

Thus in FIG. 4, the knee 33 of the toggle joint 25 is connected to the heel on the foot of the lever and is located a distance below the spool axis. The extreme positions of the lever handle will then be a mirror image of those positions seen in FIG. 1, with the lever operating in a range below the spool axis. It is significant to note, however, that actuation of the valve spool to its "FLOAT" position will then require manual movement of the handle 13 in the counterclockwise direction, whereas it was placed in "FLOAT" by clockwise movement in the FIGS. 1 and 3 orientations of the actuating lever.

Counterclockwise movement of the actuating lever 13 is also required to shift the valve spool 12 to its "FLOAT" position when the knee 33 of the toggle joint 25 is connected to the toe 29 of the lever below the axis of the valve member, as seen in FIG. 5. As therein seen, the lever handle will extend substantially lengthwise along the spool axis in "NEUTRAL."

FIG. 6 illustrates how the toggle joint 25 can be used in a control valve having only two operating positions besides "NEUTRAL," to define and releasably hold the valve member in one of those operating positions. For example, the toggle joint can be rendered effective upon movement of the actuating lever to the "LOWER" position of the mechanism to define and releasably hold the valve member 12 in said "LOWER" position. While having no bearing upon this invention, the "LOWER" position can also be a "FLOAT" position according to the arrangement disclosed in FIG. 6.

Again in this case, the foot of the actuating lever can be connected to the valve spool and to the toggle link 34 in any of the other ways discussed hereinabove, to obtain whatever orientation of the actuating lever is most convenient to the person operating the control valve.

It should be realized, of course, that while only two link attaching holes 39 have been shown in the valve body, additional link attaching holes can be formed therein. For example, a second pair can be located at opposite sides of the valve spool, with their axes normal to those of the holes 39. The actuating lever could then be oriented in any of a number of attitudes for movement in a plane normal to that in which it was constrained to move previously.

It is also a feature of this invention that the toggle joint and unique valve actuating lever described, permit mounting of the control valve close to or even on the hydraulic motor which it governs, and mounting of the lever at an operator's station remote therefrom. FIG. 7 shows such an arrangement in a diagrammatic way. As therein seen, the spool 12 of the control valve 10 is shifted through a push-pull cable 42, connectible interchangeably with either the heel or the toe of the lever 13. The end of the lever supporting link 34 opposite the knee of the toggle joint is shown pivotally connected to a suitable stationary support 43, which also serves to anchor the adjacent end of the cable sheath 44. The other end of the sheath is anchored in a stationary support 45 near the control value.

From the foregoing description, together with the accompanying drawings, it will be readily apparent to those skilled in the art that this invention provides simple and inexpensive means to enable orientation of the actuating lever of a control valve in whatever attitude is most convenient to the operator of the valve, and that it also provides for definition of several of the positions of the valve member of the valve while releasably maintaining the valve member in one of its working positions.

The invention is defined by the following claims:

1. In combination with a control valve having a body, a valve member in the body having one end portion projecting therefrom, and a spring to yieldingly resist actuation of the valve member to an operating position:
   A. a link extending outwardly from the body lengthwise alongside the projecting portion of the valve member;
   B. first pivot means connecting the inner end of the link to the body;
   C. an elongated lever providing for such actuation of the valve member to its operating position;
   D. second pivot means connecting the lever with the outer end of the link, whereby the lever is supported for pivotal motion relative to the body about either of two axes spaced apart lengthwise of the link;
   E. means including third pivot means connecting the lever with the projecting end of the valve member, and through which movement of the lever in one direction about its pivotal support is translated into movement of the valve member against the force of said spring to its said operating position;
   F. and said pivotal connections providing a toggle joint the knee of which comprises said second pivot means and is movable between the other pivot means from a toggle collapsed position across dead center of the toggle joint to a toggle cocked valve latching position in consequence of movement of the valve member in said direction to said operating position thereof, so as to releasably maintain the value member in said operating position.

2. A control valve having a body with a valve member therein movable against spring force from a first position to a second position, characterized by:
   A. actuator means for moving the valve member between said positions thereof, said actuator means comprising
      1. A lever,
      2. a pair of lever supporting link members one of which is fixed to the lever,
      3. said link members having proximal ends which are joined for articulation about a first axis,
      4. one of said link members being pivotally mounted for swinging motion about a second axis adjacent to its distal end, which second axis is fixed with respect to the valve body and parallel to said first axis,
      5. and the distal end of the other link member having a motion transmitting connection with the valve member including pivot means which provides for swinging of said other link member about a third axis parallel to said first and second axes;
   B. and said articulated links cooperating to provide an overcenter toggle type latch mechanism the knee of which is defined by their said articulated joint, and which knee is movable out of a toggle collapsed attitude toward and beyond a dead center position of alignment with and between said second and third axes, into a toggle cocked attitude in consequence of actuation of the valve member to its said second position, to thereby releasably hold the valve member against return to its first position under the spring force acting thereon.

3. In combination with a control valve having a body member and a valve member therein movable against spring force from one position to another:
   A. an actuating lever for the valve member;
   B. means connecting the actuating lever with the valve member including first pivot means providing for rocking motion of the lever about a first axis which is constrained to move with the valve member;
   C. a lever supporting link mounted at one end for pivotal motion about a second axis fixed with respect to the body member;
   D. a second pivot means connecting the other end of the link to the lever at a third axis and by which the valve member is movable to said other position thereof in consequence of rocking motion of the lever in one direction about said first axis, said link cooperating with the lever to provide an overcenter type toggle joint operatively connected with the valve member, in which the knee of the toggle is defined by said third axis and is movable toward and beyond a dead center position between and in alignment with said first and second axes into a toggle cocked latching condition at which the valve member is releasably held against return to its said one position by the spring force thereon.

4. The combination of claim 3, wherein the latching condition of the overcenter mechanism is defined by the engagement of a part on said link with a part of the control valve.

5. The combination of claim 3, wherein said second pivot means is engageable with the valve member to define the latching condition of the overcenter mechanism.

6. The combination of claim 3, further characterized by:
   A. said control valve and actuating lever being disposed at locations remote from one another;
   B. said means connecting the lever with the valve member comprising a push-pull cable having one end anchored to said first pivot means, said cable having a sheath;
   C. stationary supports at each end of the sheath, in which the adjacent end of the sheath is anchored;
   D. and said one end of the link being pivotally connected to that support which is adjacent to the actuating lever.

* * * * *